Aug. 28, 1923.
W. A. WINTER
1,465,960
FUR TREATING MACHINE
Filed Sept. 15, 1921  2 Sheets-Sheet 1
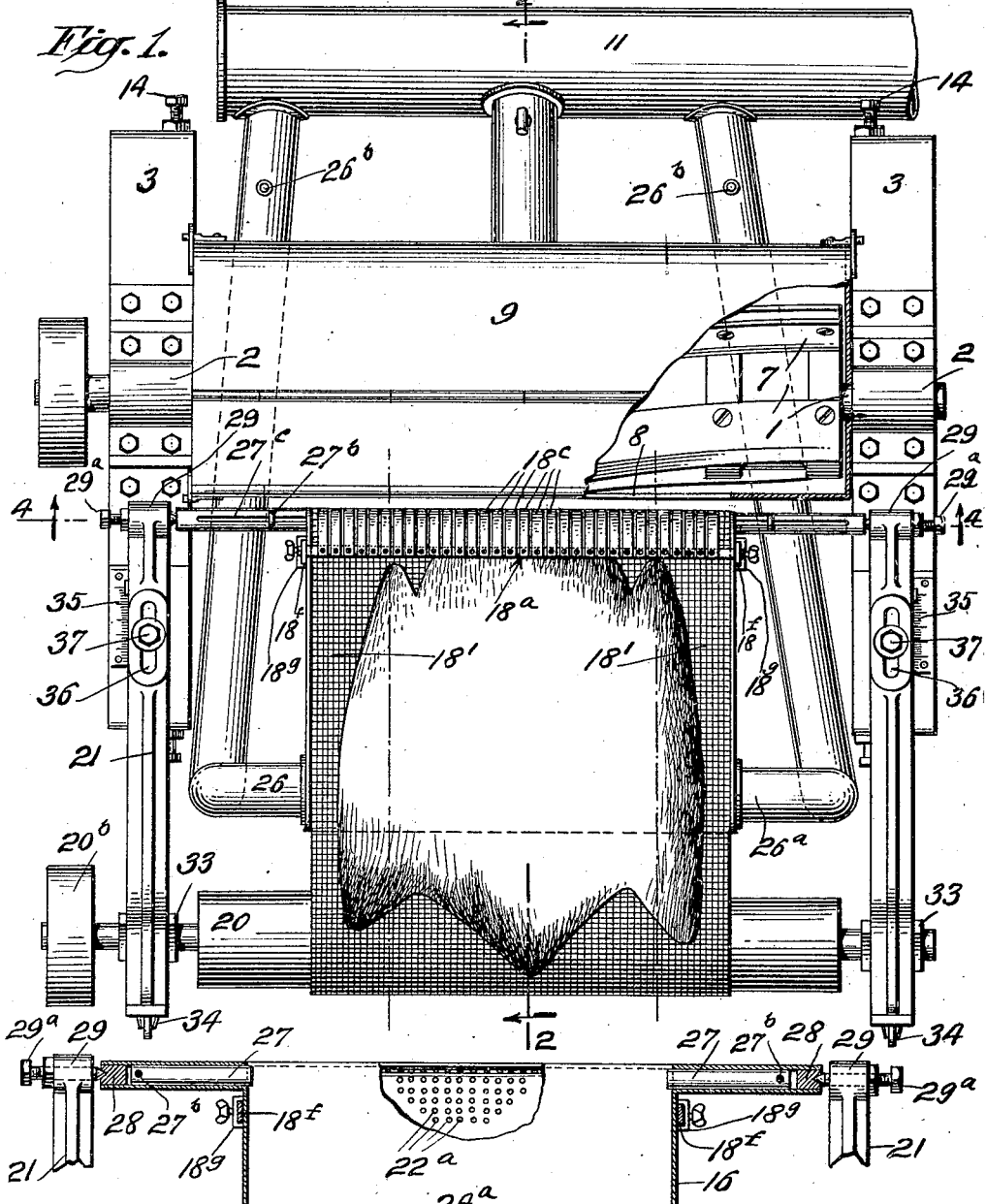
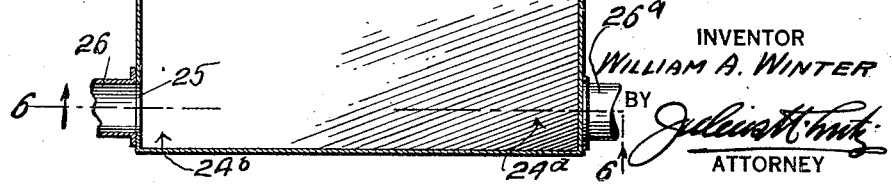
INVENTOR
WILLIAM A. WINTER
BY
ATTORNEY

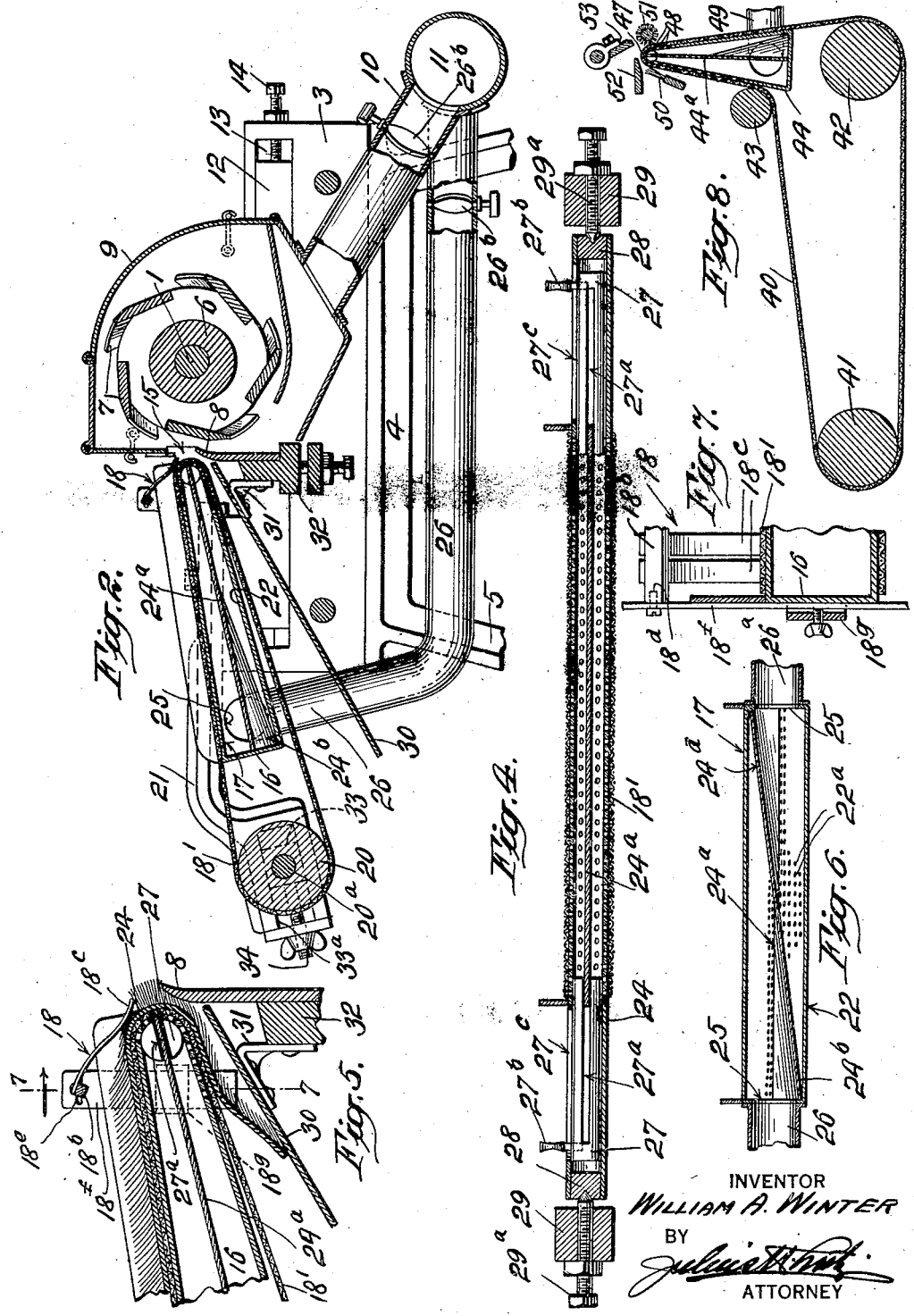

Patented Aug. 28, 1923.

1,465,960

UNITED STATES PATENT OFFICE.

WILLIAM A. WINTER, OF NEW YORK, N. Y.

FUR-TREATING MACHINE.

Application filed September 15, 1921. Serial No. 500,787.

*To all whom it may concern:*

Be it known that I, WILLIAM A. WINTER, a citizen of the United States, and a resident of the borough of Bronx, county of Bronx, city and State of New York, have invented certain new and useful Improvements in Fur-Treating Machines, of which the following is a specification.

This invention relates to improvements in fur treating machines.

My present invention is an improvement upon the machine illustrated and described in my former application Serial No. 324,428, filed September 18th, 1919, for fur treating machines, in which the feeding or movement of skins through the operating zone of shearing cutters or the like is accomplished by a conveyor belt and support combined with suction means for automatically and firmly attaching to the said belt the under skin surface of such fur-bearing skins as it approaches the zone of operation of the cutters, retaining the same in close association with the belt during its movement through said zone and then automatically releasing the skins during the backward travel of the belt; whereby the skins may be caused to travel with the belt first in one direction, then in attachment therewith in the arc of a circle through the shearing or treating zone and back in the opposite direction a part of the distance travelled by the belt, when the same is automatically released from engagement with the belt and is conveyed, preferably by gravity, from the point at which the skins are released from attachment with the belt to the front of the machine.

In the use of my former machine, I have found that the skin-attaching suction below the travelling belt caused the fur or hairs at the opposite side edges of the skin to be sucked down and to be flat against the belt during its rotation through the shearing zone, so that edge portions of the skin were not always properly sheared. In order to overcome this difficulty, I have provided means for producing a skin-attaching suction zone which will be arranged centrally in relation to and of less width than the suction slot in the cutter casing so that the central portion of the skin being sheared or otherwise treated will be fastened by suction to the travelling belt while the opposite side edges and a relatively small area adjacent thereto will be freed to permit the suction in the cutter casing to act upon and cause the erection of such hairs or fur at the edges and the consequent shearing thereof. As skins vary considerably in width, I preferably provide means for varying the width of the skin-attaching suction zone to permit the releasing or freeing of skins of such varying widths.

Another object of my invention is to increase the effectiveness of the skin attaching suction by limiting the zone of the suction apertures to the bent or circular front edge of the box and to a relatively few centrally-disposed suction apertures or perforations on the bottom thereof, said suction apertures at the front edge preferably being divided between the two independent compartments of the box, the dividing partition preferably subdividing into two equal parts the front edge and the suction apertures or perforations therein.

Another object of my present invention is to further increase the effectiveness of the skin-attaching suction apertures by subdividing the suction box into two independent suction compartments and having independent suction-pipe connections therewith.

Still another object of my invention is to provide a sensitively resilient guard contiguous to the bent or rounded front edge of the suction box to prevent the swinging up and cutting by the shearing knives of the foot and tail portions of the skin, which in many skins are very small and afford very little area to enable the skin-attaching suction to act independently thereon.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a fur shearing or cutting machine embodying my invention;

Fig. 2 is a central vertical section through said machine on the line 2—2 of Fig. 1;

Fig. 3 is a horizontal section above the dividing partition of a suction box over which the conveyor belt travels, having a portion of the partition at the front thereof broken away;

Fig. 4 is a cross-section on the line 4—4 of Fig. 1 of the skin attaching suction box and adjacent parts of the machine.

Fig. 5 is an enlarged section of the suction box and adjacent parts at the suction zone;

Fig. 6 is a section on the line 6—6 of Fig. 3 of the rear end of the skin-attaching suction box;

Fig. 7 is a section on the line 7—7 of Fig. 5; and

Fig. 8 is a cross-section of the independent suction compartment feature of my invention as applied to an unhairing machine.

Referring now to these drawings, 1 indicates a shaft mounted in bearing brackets 2 supported on side beams 3 mounted on a frame 4 having legs 5. The shaft 1 carries a sleeve 6 and a series of shearing cutters or knives 7 adapted in cooperation with a stationary vertical blade 8 to continuously shear or cut fur from a hide or skin which is caused to come into the shearing zone as hereinafter described. The shearing mechanism above described is enclosed in a suction casing 9 having, as shown, a conduit 10 communicating with another conduit 11 connected with any suitable means (not shown) for creating a suction therein. Said suction chamber has just above the blade 8 an opening or slot 15 which is of suitable width and is adapted to permit the fur of the skins to extend therethrough and into the path of the cutters. The suction in such casing 9 is adapted to cause the hair or fur on a skin to be erected or raised perpendicularly to the skin when the skin is brought into proximity to said slot and into the shearing zone of the cutters. The suction in the casing also causes the hair or fur severed by the cutters from the skins to be removed from the casing and away from the path of the cutters and deposits such severed hair in a suitable receptacle not shown.

Suitable means for adjusting the relative positions of the shaft 1 and cooperating blade 8 are provided and, as illustrated, the support 32 for the blade 8 is mounted between the blocks 12 slidable in ways 13 in the side beams 3, and the slidable blocks 12 are moved to enable adjustment between the cutters 7 and blade 8 by means of adjusting screws 14.

The above is one conventional form of fur treating or shearing mechanism with a fur-erecting suction attachment with which my improved feeding devices and skin-attaching suction means hereinafter referred to cooperates, my invention dealing more particularly with the means for causing a more effective cooperation between the fur-erecting suction and the skin attaching suction of the shearing and feeding devices respectively and the consequent better shearing or treating without mutilation of the skins.

For the purpose of so feeding the skins through the treating or shearing zone, I provide a conveyor belt 18 mounted in a manner substantially similar to the belt in my said former application. Said belt has a portion moving adjacent to said treating and fur-erecting zone so that the fur or hair of the skins will extend into the same and suction means cooperating therewith for automatically and firmly attaching the under surface of the skins to the said belt as it passes through the shearing or treating zone and then automatically releases the skins after treatment on the return movement of said conveyor belt so as to permit said skins to be delivered by gravity to the front of the machine. For the purpose of so feeding the skins, a suction casing 16 is preferably disposed, as shown, in an inclined position at one side of said shearing and fur erecting or treating zone, the upper side 17 of which casing forms a feeding table and the conveyor belt 18′ is arranged to travel in contact with the upper surface 17 of said casing and to carry the skins from the front of the machine forwardly into the operating zone where the same is, in the embodiment shown, suitably cut and then turned around in an arc and moved backwardly toward the front of the machine.

In the preferred embodiment of my invention the effectiveness of the skin attaching vacuum is increased by limiting the suction apertures in the box 16 to the front bent edge of the box or that portion over which the skins are bent and turned around in the arc of a circle for backward movement. To this end, the upper side or surface of the box is imperforate and the front bent edge thereof is provided with a U-shaped and perforated guiding bar 24 disposed parallel to the slot 15, and the bottom of the box is provided with a relatively few suction apertures 22$^a$ disposed centrally in relation to the suction apertures of the perforated bar 24. The metallic belt 18′, which is porous and preferably formed of metallic chain links, is preferably driven over the end of the table opposite to the guiding bar by means of a roller 20 mounted on a shaft 20$^a$, which is in turn driven by a pulley 20$^b$ from any suitable source of power not shown, the said shaft and roller being, as shown, supported by a bracket 21 which is in turn supported on the side beams 3. The said belt travels over the roller 20 forwardly over the upper surface 17 of the box 16, thence around the perforated guiding bar 24 which forms the front edge of the box and thence backwardly in contact with a portion of the bottom of the suction box and over the centrally disposed apertures 22ª therein, and thence further back beneath the roller 20 disposed contiguous to the rear end of the suction box. The U-shaped bar 24 is braced and the suction box 16 is divided into two independent suction chambers by a partition 24ª which extends horizontally within the box from the said U-shaped bar where it preferably subdivides the suction apertures therein in substantially two equal parts to the rear end portion thereof, the rear end portion of the said box being bent at one side of the center thereof downwardly as at 24ᵇ (Fig. 6) and into contact with the bottom of the box 22 so as to permit an independent connection with the suction pipe 26, while the end portion of said partition at the opposite side of the center thereof is bent upwardly as at 24ᵈ into contact with the upper surface 17 of the box, whereby an independent connection is permitted with the suction pipe 26ª.

The U-shaped guide bar 24 in the present embodiment of my machine is preferably elongated so as to extend laterally at opposite sides of the suction box and preferably has mounted or seated in each hollow end thereof shutters 27 movable laterally to shut off a portion or portions of the suction apertures through said bar 24 so as to vary the width or limit the extent of such suction apertures to permit the attachment only of predetermined portions of skins of varying widths and to enable the freeing or releasing of the side edges of skins of such varying widths. In this way the fur or hairs at the opposite side edges of the skin will be released from the suction in the box so as to prevent the same from being sucked down to lie flat against the belt during its rotation through the shearing zone and causing this portion of the fur or hair at the side edges to be erected or raised perpendicularly to the skin and belt by means of the suction in the cutter casing, whereby such hairs or fur at the side edges will be caused to extend into the slot in the casing and will be sheared or otherwise treated.

In the form shown, the shutters 27 are each provided with slots 27ª which extend over the partition 24ª so as to simultaneously close the suction perforations on opposite sides thereof and each of these shutters 27 is provided with an operating finger piece 27ᵇ which, as shown, is disposed vertically and extends through a slot 27ᶜ in the U-shaped bar 24. As illustrated, said U bar is closed at its opposite ends by plugs 28 and said bar is supported at said ends from the brackets 29 by screws 29ª.

When a fur skin is mounted upon said travelling belt, which is preferably formed of a rough metallic chain mesh which will be caused to pass over the imperforate top side of the box, it will be carried forward by such belt until the front edge thereof reaches the suction apertures at such front edge of the box and as the belt continues to travel the suction apertures will cause a gripping and a suction attachment to the belt of the said skin as it passes around said bent front edge and through the treating zone. The efficiency of the suction is greatly increased by concentrating or limiting the suction apertures to this bent front edge and by the further subdivision of such apertures at the front edge by means of the horizontal partition 24ª and independent connections of such compartments with the separate suction pipes 26, 26ª. The skin will thus by such concentration of suction energy be more firmly gripped and attached to the belt while it is passing through the operating or shearing zone of the cutters.

It is desirable to retain or hold the skin in contact with the belt during a portion of its travel beneath the box but I found that a relatively few centrally disposed apertures in the bottom of the box will serve this purpose and also conserve the suction energy so that when the skin has passed over the perforated front bent edge it will be held for a short period and will thereupon fall by gravity upon an inclined slide or chute 30 which will conduct the same to the front of the machine or into a suitable receptacle therefor. This chute 30 is, as shown, supported in an inclined position by means of a bracket 31 secured to an adjustable support 32 for the blade 8.

Vacuum may be produced in any suitable manner in the chambers of the box 16 and as shown said box has side openings 25 connected to the main suction conduit 11 by the side conduits or pipes 26,—the degree of vacuum produced in the chambers is controlled by dampers 26ᵇ.

It sometimes happens that when the rear end or tail and foot portions of a skin are travelling over the perforations, and the body of the skin has passed over the same so as to leave said perforations uncovered, the sudden variation in pressure and the limited extent of such tail and foot portions cause the same to be released and to be projected against the cutters and destroyed. In order to obviate this, I mount adjacent to the entrance slot 15 and in operative relationship to the belt 18′ a hold-down guard member 18 comprising a cross-bar 18ᵇ having attached at their inner ends a series of guard fingers 18ᶜ with the outer free ends curved downwardly and extending into contiguity to the cutting slot 15 so as to procure a sensitive and very resilient hold down guard member which retains the skin in contact with the conveyor belt and prevents the destruction of such end portion of the skin as aforesaid. This guard member 18 is preferably mounted to be adjustable forwardly and rearwardly and also pivotally by pins 18ᵈ extending through slots 18ᵉ in upright bars 18ᶠ which are adjustably secured to the suction box 16 by cleats 18ᵍ.

The belt and its supporting parts are preferably adjustable in the conventional manner toward and away from the slot 15 so as to enable greater or less lengths of hair to be severed from the skins which are being operated upon, and for this purpose I have caused the shaft 20ᵃ to be mounted in a block 33 sliding in ways 33ᵃ and adjustably movable in said ways by means of a screw 34.

In order to permit such adjustment the bracket 21 is connected to the beams 3 by means of a slot 36 and bolt 37 and I preferably provide adjacent to the bolt 37 a scale 35 for determining the extent of movement of the conveyor belt and supporting parts.

In Fig. 8 I have illustrated diagrammatically a modified form of my invention comprising an unhairing machine in which my invention is adapted to be used. In this figure, 40 indicates a conveyor belt which is driven by rollers 41—42 and bent around a roller 43 and thence travels upwardly on one side of a suction box 44, around a perforated bar 47 at the upper edge thereof and downwardly at the opposite side of the box. The box is divided by a partition 44ᵃ similar to the partition 24ᵃ to provide front and rear suction compartments and the air is exhausted from the box through the conduits 49 leading to any suitable source of suction not shown. The rear side of the said box is provided with a relatively few suction apertures 48. The conveyor belt in this construction is, of course, also porous and a skin carried thereby will be automatically held in contact therewith during its movement through the zone of operation of the brushes 50—51 and of the unhairing or cutting elements 52—53, and furthermore will be automatically released from attachment to said belt in the receding or return travel of the belt after passing through the zone of operation of the unhairing mechanism.

Having described my invention I claim:—

1. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge of less lateral extent than the fur-erecting aperture of the casing, a porous belt travelling forwardly and backwardly on opposite surfaces of said box and around said front edge, and means for creating a partial vacuum within the box, whereby the fur at the side edges of the skin may be released from the suction of the skin-attaching apertures and be subjected to the suction of the fur-erecting aperture of the casing.

2. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge of less lateral extent than the fur-erecting aperture of the casing, said box also being provided with an imperforate top surface and perforations in its bottom surface arranged centrally of the perforations in the front edge, a porous belt travelling forwardly and backwardly on opposite surfaces of said box and around said front edge, and means for creating a partial vacuum within the box whereby the fur at the side edges of the skin may be released from the suction of the skin attaching apertures and be subjected to the suction of the fur-erecting aperture of the casing.

3. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge of less lateral extent than the fur-erecting aperture of the casing, said box also being provided with an imperforate top surface and perforations in its bottom surface arranged centrally of the perforations in the front edge, and also diminishing in lateral extent from the front edge of the box toward the rear thereof, a porous belt travelling forwardly and backwardly on opposite surfaces of said box and around said front edge, means for creating a partial vacuum within the box whereby the fur at the side edges of the skin may be released from the suction of the skin attaching apertures and be subjected to the suction of the fur-erecting aperture of the casing.

4. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge of less lateral extent than the fur-erecting aperture of the casing, a porous belt travelling forwardly and backwardly on opposite surfaces of said box and around said front edge, means for creating a partial vacuum within the box whereby the fur at the side edges of the skin may be released from the suction of the skin-attaching apertures and be subjected to the suction of the fur-erecting aperture of the casing and means for varying the width of said skin attaching suction apertures in the front edge of said box.

5. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge, a porous belt travelling forwardly and backwardly on opposite surfaces of said box and around said front edge, a partition within said box dividing the same into two independent suction compartments each communicating with a portion of said skin-attaching suction apertures at the front edge of the box and also having an independent connection with a suction pipe.

6. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge, a porous belt travelling forwardly and backwardly on opposite surfaces of said box and around said front edge, a partition within said box dividing the same into two independent suction compartments each communicating with a portion of said suction apertures at the front edge of the box and each having the opposite side portions of its rear end bent in opposite directions to form independent compartments with enlarged rear ends at one side, and each compartment having an independent-pipe communicating with the chamber adjacent to said bent portion of the partition.

7. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge, a porous belt travelling forwardly and backwardly on opposite surfaces of said box and around said front edge, and a guard plate arranged above said suction apertures to prevent the swinging into the treating zone of the loosely attached rear portions of the skin.

8. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge of less lateral extent than the fur-erecting aperture of the casing, a porous belt travelling forwardly and backwardly on opposite surfaces of said box and around said front edge, means for creating a partial vacuum within the box whereby the fur at the side edges of the skin may be released from the suction of the skin-attaching apertures and be subjected to the suction of the fur-erecting aperture of the casing, laterally-movable shutters arranged at opposite sides of the skin-attaching suction apertures to vary the lateral extent of such suction apertures in the front edge of the box.

9. The combination with a suitable fur treating mechanism provided with a suction casing having a laterally-extending fur-erecting suction aperture therein of predetermined length and means for producing a partial vacuum within the casing, of a suction box having a bent front edge arranged adjacent to the said suction aperture in the casing and provided with skin-attaching suction apertures at said front edge of less lateral extent than the fur-erecting aperture of the casing, a porous belt travelling forwardly and backwardly on opposite surfaces of said box and around said front edge, means for creating a partial vacuum within the box whereby the fur at the side edges of the skin may be released from the suction of the skin-attaching apertures and be subjected to the suction of the fur-erecting aperture of the casing, laterally movable shutters embracing said partition and arranged at opposite sides of the skin-attaching suction apertures to vary the lateral extent of such suction apertures in the front edge of the box and at opposite sides of the partition.

10. The combination with a suitable fur treating mechanism provided with a suction casing having a laterally extending fur-erecting suction aperture therein, of a porous belt travelling forwardly and backwardly on opposite surfaces of said box and around said front edge, means for creating a partial vacuum within the box whereby the fur at the side edges of the skin may be released from the suction of the skin-attaching apertures and be subjected to the suction of the fur-erecting aperture of the casing and a resilient hold-down member disposed parallel to and above said porous belt and having a portion arranged contiguous to said fur erecting suction aperture.

11. The combination with a suitable fur treating mechanism provided with a suction casing having a laterally extending fur-erecting suction aperture therein, of a porous belt travelling forwardly and backwardly on opposite surfaces of said box and around said front edge, means for creating a partial vacuum within the box whereby the fur at the side edges of the skin may be released from the suction of the skin-attaching apertures and be subjected to the suction of the fur-erecting aperture of the casing and a resilient hold-down member disposed parallel to and above said porous belt and having a portion arranged contiguous to said fur erecting suction aperture, said hold down member comprising a rigid cross bar and a series of resilient fingers extending forwardly therefrom into contiguity with said fur erecting suction aperture.

In witness whereof, I have signed my name to the foregoing specification in the presence of two subscribing witnesses.

WILLIAM A. WINTER.

Witnesses:
JOSEPH F. O'BRIEN,
HELEN V. WHIDDLER.